United States Patent [19]

Grossner et al.

[11] 4,370,965
[45] Feb. 1, 1983

[54] IGNITION DISTRIBUTOR FOR INTERNAL COMBUSTION ENGINES

[75] Inventors: Horst Grossner, Berglen; Detlef Kaminski, Kornwestheim; Paul Schwerdt, Freudenstadt, all of Fed. Rep. of Germany

[73] Assignee: Daimler-Benz Aktiengesellschaft, Stuttgart, Fed. Rep. of Germany

[21] Appl. No.: 257,467

[22] Filed: Apr. 27, 1981

[30] Foreign Application Priority Data

Apr. 24, 1980 [DE] Fed. Rep. of Germany ....... 3015807

[51] Int. Cl.³ .............................. F01L 1/34; F02P 1/00
[52] U.S. Cl. ............................... 123/426; 123/146.5 A
[58] Field of Search ................... 123/146.5 A; 310/92; 192/116 J

[56] References Cited

U.S. PATENT DOCUMENTS

| | | | |
|---|---|---|---|
| 3,785,356 | 1/1974 | Niemoeller | 123/426 |
| 4,158,350 | 6/1979 | Möller et al. | 123/426 |
| 4,302,638 | 11/1981 | Fox et al. | 123/146.5 A |
| 4,305,352 | 12/1981 | Oshima et al. | 123/146.5 A |
| 4,315,493 | 2/1982 | Obishi et al. | 123/146.5 A |

FOREIGN PATENT DOCUMENTS 56-32076  1/1981  Japan ................................... 123/426

Primary Examiner—Raymond A. Nelli
Attorney, Agent, or Firm—Paul M. Craig, Jr.

[57] ABSTRACT

An ingnition distributor for an internal combustion engine, more particularly, for a motor vehicle internal combustion engine having an electronic ignition system driven by a distributor shaft which, in turn, is driven by the engine and having a device for changing a phase relationship between the distributor shaft and a distributor rotor. A control disk is rotatably mounted on the distributor shaft and is rigidly coupled with the distributor rotor. The rotation of the distributor shaft is capable of being transmitted to the control disk by means of at least one spring. An electromagnet is provided between the two poles of which the control disk is rotated, with the electromagnet forming with the control disk an anti-current brake. An electronic phase control is provided for regulating an excitation current of the electromagnet in accordance with a difference between the actual and set value of the phase displacement in dependence upon operating parameters of the internal combustion engine.

7 Claims, 1 Drawing Figure

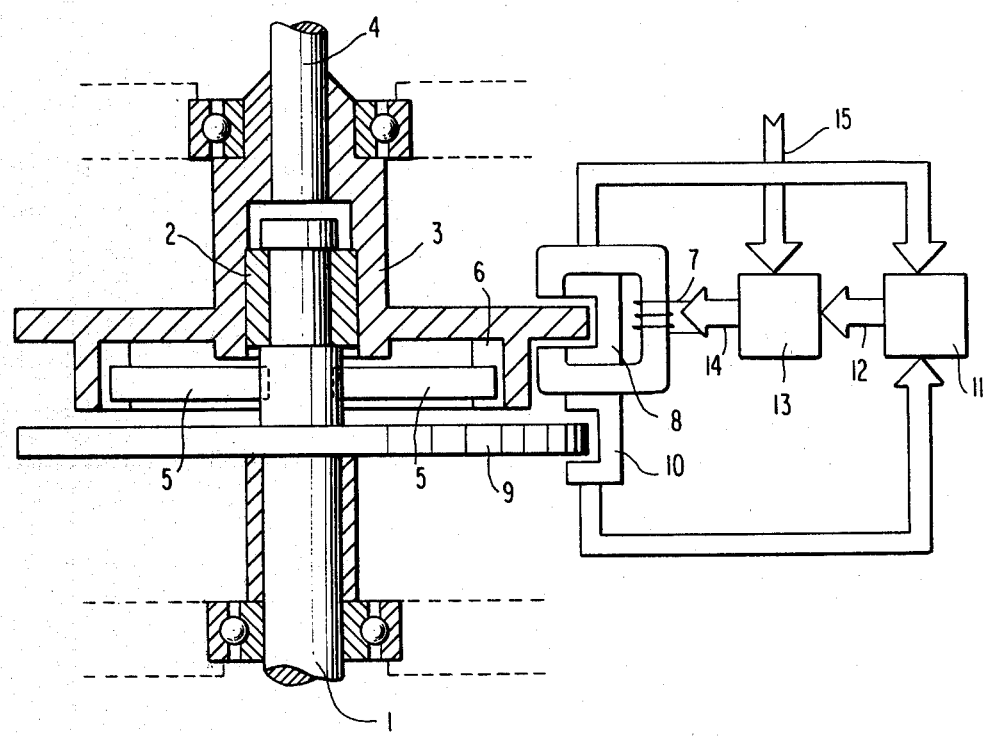

IGNITION DISTRIBUTOR FOR INTERNAL COMBUSTION ENGINES

The present invention relates to an ignition distributor for internal combustion engines and, more particularly, to an ignition distributor for motor vehicle internal combustion engines having electronic ignition regulation means driven by a distributor shaft which, in turn, is driven by the engine, and including a means for charging a phase relationship between the distributor shaft and the distributor rotor.

In order to attempt to obtain an optimum performance for a spark-ignited internal combustion engine, it is necessary to shift an ignition point relative to an upper dead center of the piston in the cylinder so as to adapt the same to a particular operating condition or load range on the engine. The shifting of the ignition point renders necessary a corresponding change in a phase relationship between the distributor shaft of the ignition distributor and the distributor rotor in order to ensure an optimum distribution of ignition sparks to the individual cylinders of the engine.

Ignition distributors have been proposed which are adapted to change a phase relationship between the distributor shaft and the distributor rotor by means of, for example, mechanical governors such as flyweight governors or centrifugal governors as well as by vacuum control or vacuum advance units.

A disadvantage of the above-noted ignition distributors resides in the fact that the phase relationship depends solely upon the engine speed and the intake manifold vacuum and, consequently, other operating parameters of the engine are not taken into account.

The aim underlying the present invention essentially resides in providing an ignition distributor for a spark-ignited internal combustion engine which is adapted to change a phase relationship between the distributor shaft and distributor rotor taking into account not only engine speed and intake manifold but also other engine operating parameters.

In accordance with advantageous features of the present invention a control disk is rotatably mounted on a distributor shaft of the ignition distributor and rigidly coupled with the distributor rotor, with the rotation of the distributor shaft being transmitted to the control disk by means of at least one spring arrangement. An electromagnet is provided and arranged so that the control disk rotates between the poles thereof and forms therwith an eddy current brake. An electronic ignition system or phase control arrangement is provided which governs an excitation current of the electromagnet in accordance with a difference between an actual value and a set or desired value of a phase displacement for predetermined operating and/or load conditions of the internal combustion engine.

Advantageously, in accordance with the present invention, the actual value of the phase displacement is determined by a difference between a phase position of the distributor shaft and that of the control disk.

Preferably, the electronic phase control for determining the time of ignition is incorporated into an electronic computer arrangement of the electronic ignition system.

Accordingly, it is an object of the present invention to provide an ignition distributor for spark-ignited internal combustion engines which avoids, by simple means, shortcomings and disadvantages encountered in the prior art.

Another object of the present invention resides in providing an ignition distributor for spark-ignited internal combustion engines which is adapted to alter a phase relationship between a distributor shaft and distributor rotor in dependence upon an engine speed, intake manifold vacuum, and/or other operating parameters of the engine.

A further object of the present invention resides in providing an ignition distributor for internal combustion engines which is simple in construction, light in weight, and relatively inexpensive to manufacture.

A still further object of the present invention resides in providing an ignition distributor for internal combustion engines which functions realiably under all load conditions of the engine.

These and other objects, features, and advantages of the present invention will become more apparent from the following description when taken in connection with the accompanying drawing which shows, for the purposes of illustration only, one embodiment in accordance with the present invention, and wherein:

The single FIGURE of the drawing is a partially schematic cross sectional view of an ignition distributor constructed in accordance with the present invention for a spark-ignited internal combustion engine.

Referring now to the single FIGURE of the drawing, according to this figure, an ignition distributor, disposed in a housing indicated in phantom lines, includes a distributor shaft 1 having rotatably mounted thereon a control disk 3 by a plane bearing 2. A shaft 4 is rigidly coupled with the control disk 3, with a distributor rotor (not shown) being mounted on the shaft 4. Two diametrically opposed leaf springs 5 are rigidly coupled to the distributor shaft 1, with the leaf springs 5 protruding radially outwardly from the distributor shaft 1 and engaging in carrier slots 6 provided in the control disk 3 so as to allow the control disk 3 to rotate in a predefined or definite angular range with respect to the distributor shaft 1.

An electromagnet 7 is disposed along a peripheral edge of the control disk 3 so that the peripheral edge of the disk 3 is disposed in a magnetic field developing between the poles of the electromagnetic 7. A phase detector 8, of conventional construction, is provided for scanning the movement of the control disk 3 while a movement of the distributor shaft 1, having mounted thereon another disk 9, is scanned by a further phase detector 10. Both phase relationships refer to a definite position of the distributor shaft 1 or the control disk 3 as the case may be assigned to an upper dead center position of a piston in the respective cylinders of the engine. A comparator 11 of an electronic phase control arrangement is provided for comparing with each other the signals of the phase detectors 8 and 10, with the comparator being adapted to transmit a signal 12 to a governor or regulator 13 which is proportional to the difference in the phases. The governor or regulator 13 is adapted to control or determine the excitation current for the electromagnet 7 by comparing the actual value signal 12 proportional to the phase difference with a wet value signal 15 received from an electronic ignition system.

The ignition distributor is driven by a distributor shaft 1 at half the rotational speed of the engine. The control disk 3 and thereby the distributor rotor also rotate at half the engine rotational speed following a phase in or transient phenomena. The control disk 3 and electromagnet 7 cooperate as an eddy current brake, so that the control disk 3, depending upon an intensity of the excitation current provided by the signal 14, lags behind with respect to the distributor shaft 1 thereby producing a phase displacement. The electronic phase control device including the comparator 11 and governor or regulator 13 regulates or controls the phase displacement corresponding to a firing angle exactly after the set value signal 15 received from the electronic ignition system. The electronic phase control may be incorporated into a computer arrangement of the electronic ignition system so that the ignition distributor can easily be constructed from a few inexpensive components.

As can readily be appreciated, it is also possible to adjust the phase displacement by means of a mechanical differential gear with regulation being accomplished through a planetary gear arrangement in lieu of an eddy current brake.

While we have shown and described only one embodiment in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

We claim:

1. An ignition distributor for an internal combustion engine having an electronic ignition control means, the distributor including a distributor shaft means driven by the engine, and a rotor means, characterized in that means are provided for changing a phase relationship between the distributor shaft means and the rotor means including a control disk mounted on the distributor shaft means so as to be rotatable relative thereto, the rotor means is fixedly mounted to the control disk, means for transmitting a rotation of the distributor shaft means to the control disk, and means for regulating a rotational speed of the control disk in accordance with a difference between an actual value of a phase displacement and a desired value of a phase displacement for a given operating condition of the engine.

2. An ignition distributor according to claim 1, characterized in that the means for regulating includes an electromagnetic means, the control disk means is arranged so that at least a peripheral position thereof is rotated between the poles of the electromagnet so as to result in a formation of an eddy current brake, and an electronic phase control means for controlling an excitation current of the electromagnetic means in response to the difference in phase displacement.

3. An ignition distributor according to claim 2, characterized in that phase detector means are provided for detecting the actual value of the phase displacement by a difference between a phase position of the distributor shaft means and a phase position of the control disk.

4. An ignition distributor according to one of claims 2 or 3, characterized in that the electronic phase control means is incorporated into a computer means of the electronic ingition system.

5. An ignition distributor according to claim 4 characterized in that the transmitting means includes a spring means interposed between the distributor shaft means and the control disk.

6. An ignition distributor according to claim 5, characterized in that the spring means includes at least two diametrically opposed radially extending leaf springs, and in that the control disk includes stop means for accommodating the leaf springs.

7. An ignition distributor according to claim 1, characterized in that the regulating means includes a mechanical gear arrangement.

* * * * *